CARD POSITIONING AND GUIDING MECHANISM

Filed Dec. 29, 1961 3 Sheets-Sheet 1

INVENTORS:
ROBERT E. SCHOPP
ALBERT S. CHOU
CHESTER E. SPURRIER

BY Hansell & Lane
THEIR ATTORNEYS.

CARD POSITIONING AND GUIDING MECHANISM

Filed Dec. 29, 1961 3 Sheets-Sheet 2

INVENTORS:
ROBERT E. SCHOPP
ALBERT S. CHOU
CHESTER E. SPURRIER

BY Hansen & Lane
THEIR ATTORNEYS

CARD POSITIONING AND GUIDING MECHANISM

Filed Dec. 29, 1961 3 Sheets-Sheet 3

INVENTORS:
ROBERT E. SCHOPP
ALBERT S. CHOU
CHESTER E. SPURRIER

BY Hansen and Lane
THEIR ATTORNEYS.

United States Patent Office 3,168,309

Patented Feb. 2, 1965

3,168,309

CARD POSITIONING AND GUIDING MECHANISM

Robert E. Schopp, San Jose, Albert S. Chou, Campbell, and Chester E. Spurrier, San Jose, Calif., assignors to International Business Machines Corporation, New York, N.Y., a corporation of New York Filed Dec. 29, 1961, Ser. No. 163,208
9 Claims. (Cl. 271—58)

The present invention relates to card feeding mechanism, and pertains more particularly to a mechanism for gently positioning and firmly and accurately guiding a card during a right angle change in its direction of movement.

The cards for which the present invention is primarily intended are of the well known punched data type, wherein the area of an elongated rectangular card is divided into columns and lines, and intersections of which, when punched out, are assigned meanings or values, such as, for example, of alphabetical or numerical significance. The cards are fed, one at a time, to card processing machines which either punch the card at required intersections, or detect the location of such punchings and thus "read" or translate such punchings as to their assigned significance.

In view of the fact that the significance of each punch mark in such cards is determined by its location on the card, it is essential that each card be accurately located for each punching and reading operation performed thereon. To this end it is customary to clip one corner of each card for identifying its position in the processing machines, and to use one particular longer edge of each card as a guide in positioning such cards for punching and reading.

In handling the cards for punching or reading it is customary to stack them in superposed relation in a magazine, and to feed successive lowermost cards from the stack by means of a well known mechanism including a device usually referred to as a picker knife. Such cards usually are fed, transversely of their length, to a first position or station from which they are then transferred lengthwise thereof to one or more card processing stations either for punching or reading as required.

The present invention contemplates the accurate positioning, and subsequent guiding, of each of a plurality of such cards fed thereto, one at a time, and includes lateral and longitudinal feed means, and a spring biased, elongated, positioning and guide member which is spaced from a second, fixed, aligning member by a distance normally slightly less than the width of the cards to be processed, each card being initially fed laterally thereof against the spring biased member with sufficient force to displace said member against its spring bias, and simultaneously to carry the card beyond the fixed aligning member, after which the card is released for urging by the spring biased member rearwardly, relative to its initial direction of feed, and into abutting, aligned engagement with the fixed aligning member, after which the spring biased member is gripped to anchor it in fixed, guiding position during a subsequent movement of the card lengthwise thereof.

Another object of the invention is to provide a card positioning and guiding mechanism wherein one member thereof is resiliently displaceable into aligned relation with one edge of a card moved edgewise thereof into engagement therewith and is subsequently firmly gripped while in conforming, guiding engagement with such card so as to resist angular displacement of the member or the card during a feeding operation of the card along such member.

Another object of the invention is to feed a card beneath a guide plate and into abutting, displacing relation with an elongated, lightly spring biased positioning and guide member which is thereby aligned with the leading edge of such card, after which the card is released, and the spring biased guide member urges the card into desired, aligned condition, after which the spring biased member is anchored to prevent its displacement during a subsequent feeding operation of the card along said positioning and guide member.

A further object of the invention is to provide an improved card positioning and guide mechanism.

The foregoing and other objects, features and advantages of the invention will be apparent from the following more particular description of a preferred embodiment of the invention, as illustrated in the accompanying drawings, wherein.

Figures 1, 7, 8, 9:
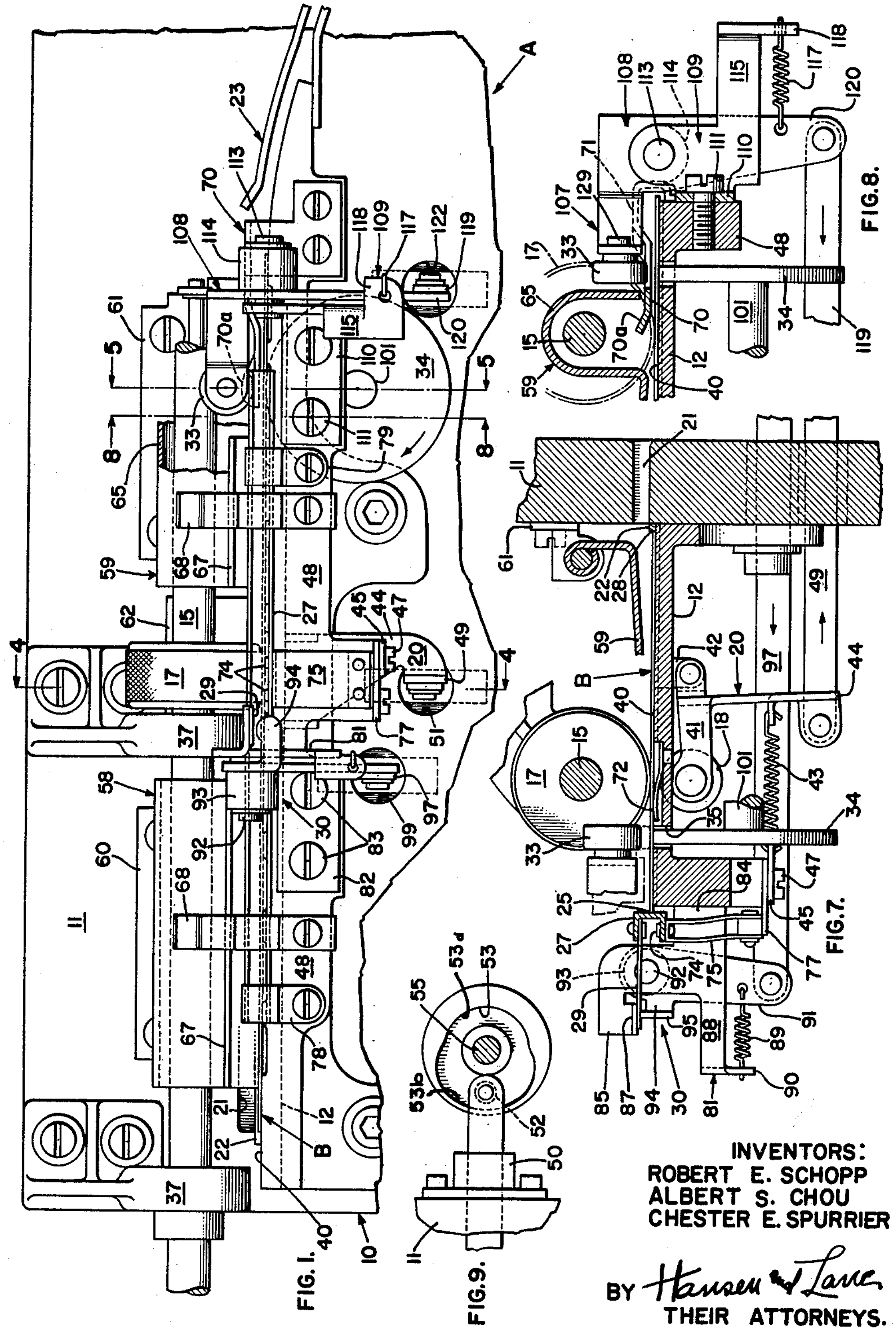
FIG. 1 is a front elevational view of a card positioning and guide mechanism embodying the invention, a card magazine and card feeding mechanism of a parent machine being omitted, portions being broken away.
Figures 3, 4, 5, 6:
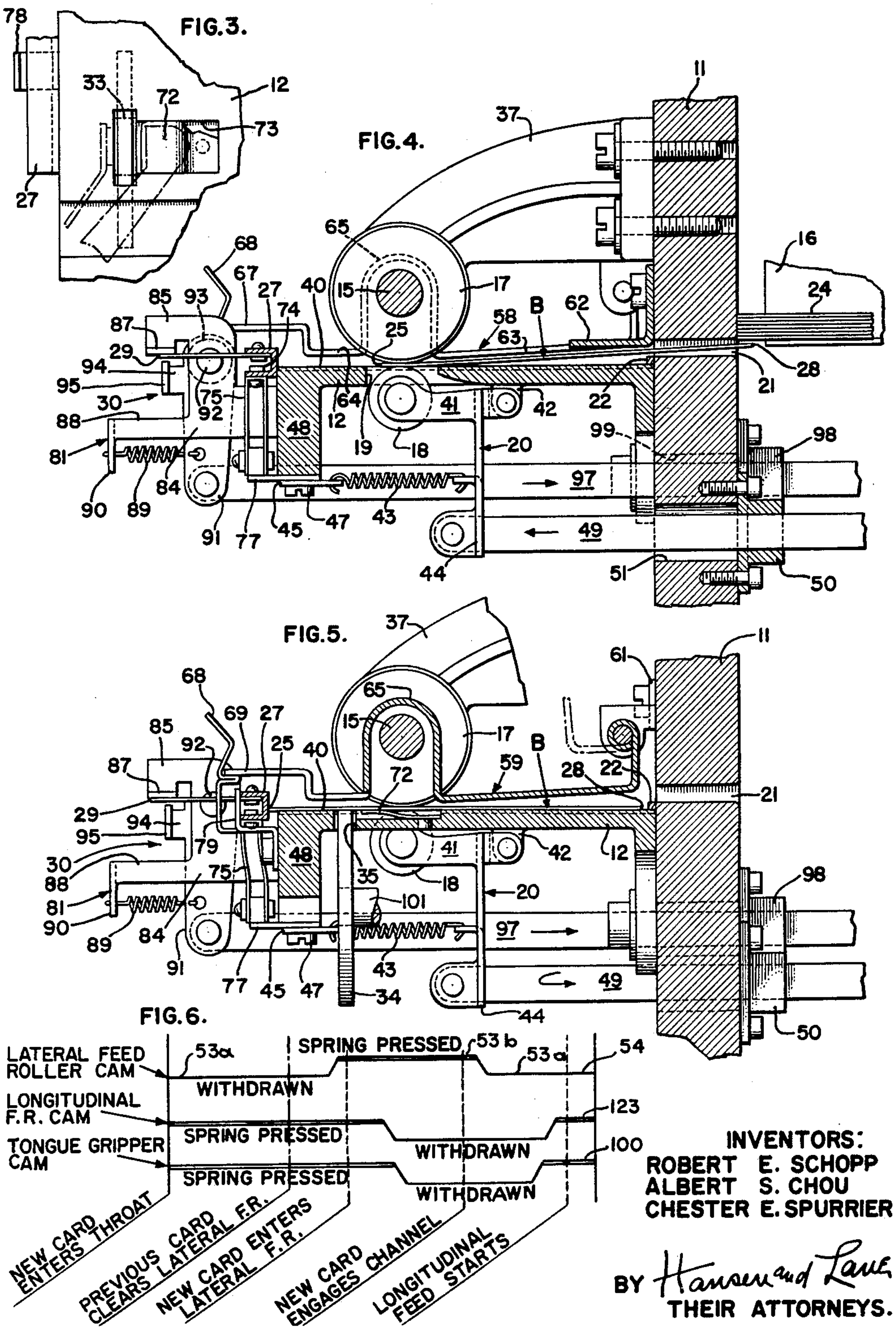
FIG. 3 is an enlarged, fragmentary, plan view of a fragment of the bed with the longitudinal card feed roller mounted therein, the associated presser roller and card guide finger being shown in dash-dot lines.
FIG. 4 is a fragmentary, sectional view to the same scale as FIG. 3, taken along line 4—4 of FIG. 1, the leading portion of a card being shown gripped between the lateral feed roller and its presser roller.

FIG. 5 is a sectional view taken along line 5—5 of FIG. 1, the card being shown in its maximum state of advance by the lateral feed roller, and upon the point of being released therefrom, an overlying card guide plate being shown in solid lines in downwardly swung, card guiding position, and in dash-dot lines in upwardly swung, inoperative position, the presser roller for the longitudinal feed roller being omitted.

FIG. 6 is a graphic diagram showing the action of the three cams during one cycle of operation of the illustrated mechanism.

FIG. 7 is a sectional view similar to FIG. 5, but showing a card in fully aligned position, ready to be driven lengthwise thereof, the presser roller for the longitudinal feed roller being shown in card releasing position in solid lines, and in card feeding position in broken lines, portions being broken away.

FIG. 8 is a fragmentary, sectional view taken along line 8—8 of FIG. 1, showing the presser roller for the longitudinal feed roller and associated mechanism.

FIG. 9 is a sectional view taken along line 9—9 of FIG. 1.

Briefly, the illustrated embodiment A of the invention comprises a rigid metal frame 10 having an upright wall portion 11, a shelf-like bed 12 extending forwardly therefrom, and (FIG. 2) a pair of upright, rearwardly extending frame plates 13 and 14. A constantly rotating shaft 15 above the bed 12 has a lateral feed roller 17 mounted thereon, which roller operates in conjunction with a cam-controlled presser roller 18 mounted in an opening 19 in the bed 12. The presser roller 18 is journaled on one arm of a bell crank lever 20 for timed movement into and out of card-gripping relation with the lateral feed roller 17.

The mechanism A operates in recurring cycles in timed relation with a parent, card processing mechanism, not shown, to accept successive cards B fed to the lateral feed roller 17 by the parent machine through a throat 21 in the wall 11, to align each card against an aligning bar 22 beneath the throat 21, and then to retain each card in such aligned condition while driving it lengthwise down a chute 23 (FIG. 1) to such other processing as may be provided by the parent machine.

As each card B is fed transversely of its length from the bottom of a stack 24 of cards (FIG. 4) through the throat 21 by usual, well known, card feeding mechanism of the parent machine (not shown) and is advanced to the position thereof shown in FIG. 4, the leading edge 25 of the card is seized between the lateral feed roller 17 and its presser roller 18, which at approximately this point in the cycle are moved into card-gripping relation with each other. The constantly rotating lateral feed roller 17 continues to advance the card B transversely of its length to the maximum advanced position thereof illustrated in FIG. 5, wherein the leading edge 25 of the card has engaged an elongated, spring mounted, card positioning and guide member 27, and has moved the latter outwardly away from the edge of the bed 12.

As the card B reaches its maximum advanced position of FIG. 5, the presser roller 18 for the lateral feed roller 17 is swung downwardly to release the card B, which thereupon is pushed back in the opposite direction by the spring mounted member 27 until its opposite edge 28 engages and aligns itself with the aligning bar 22, which is affixed to the bed 12 just below the throat 21.

At this stage of the cycle, an anchoring tongue 29, which is fixedly secured to the elongated positioning and guide member 27, and which up to this point has been riding freely within an anchoring clamp 30, is firmly clamped thereby as shown in FIG. 6 to anchor the positioning and guide member 27 against lateral swinging movement during a subsequent longitudinal feeding movement of the card B along the bed.

Figure 2:
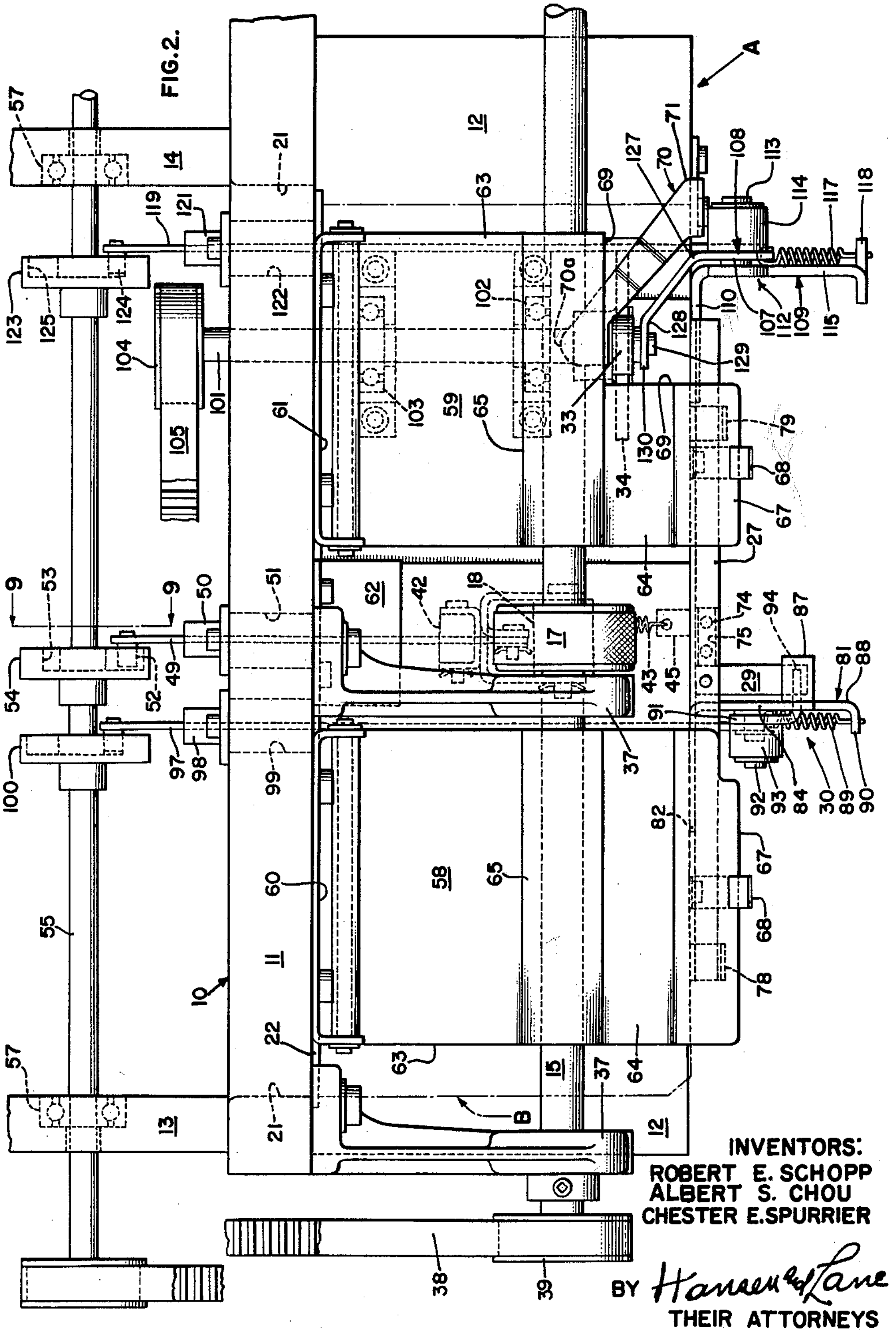
FIG. 2 is a plan view of the mechanism shown in FIG. 1, portions being broken away.

A presser roller 33 (omitted in FIG. 5 but shown in FIGS. 1, 2, 7 and 8) and associated with a constantly rotating longitudinal feed roller 34, is then swung downwardly, forcing the card B into driven relation with the longitudinal feed roller 34, which is exposed through an opening 35 in the bed 12. The longitudinal feed roller 34 advances the card B lengthwise thereof toward the right as shown in FIGS. 1 and 2, and thence downwardly through the chute 23 (FIG. 1) for such subsequent processing as may be required.

The anchoring tongue 29 is then released to free the positioning and guide member 27 for displacement to its position of FIG. 5 when it is engaged by the leading edge 25 of the next succeeding card as the latter is moved into engagement therewith during the next succeeding cycle of operation.

*Detailed description*

Referring to the drawings in greater detail, the frame 10, comprising the upright wall 11, the shelf-like bed 12 and the rearwardly extending plates 13 and 14 (FIG. 2) is a portion of the parent card processing mechanism (not shown) with which the present card positioning and guide mechanism A is associated. A card magazine indicated at 16 in FIG. 4 is of a well known type and is mounted on the opposite side of the wall 11 from the bed 12 to support a stack 24 of cards B in position to have the cards fed, one at a time, in a well known manner, from the bottom of the stack through the throat 21. Since such card holding magazines and the mechanism for feeding the cards, one at a time and in timed sequence through such a throat are well known, and since they are not a feature of the present invention, they are omitted from the present description and the accompanying drawings.

The drive shaft 15 is journaled in conventional bearings mounted in bearing support brackets 37 secured to the wall member 11. The shaft 15 is driven from a suitable power source, such as an electric motor, not shown, by a conventional timing-type belt 38 (FIG. 2) operatively engaging a timing-type pulley 39 secured to the shaft 15. The lateral card feeding roller 17 is mounted on the shaft 15 to rotate therewith, and is of a diameter to just clear the top surface 40 of the bed 12 sufficiently to admit a card B therebeneath without distortion.

The presser roller 18 which co-operates with the lateral feed roller 17 is journaled on the free end of an outwardly extending yoked arm 41 of the bell crank lever 20, which is pivotally mounted on a bracket 42 on the under side of the bed 12. The presser roller 18 and the upper edges of the arm 41 ride in the opening 19 in the bed 12, and the presser roller 18 is urged toward pressing, card gripping engagement with the lateral feed roller 17 by a stiff coil spring 43. The latter is connected in tension between a downwardly extending arm 44 of the bell crank lever 20 and a small eye plate 45, which is attached by a screw 47 to the under side of an irregularly shaped apron 48 which extends downwardly from the outer edge of the bed 12. The presser roller 18 is swung downwardly to card releasing position by the cam-actuated retraction of an associated link 49 during its inoperative part of each cycle of the mechanism A.

The link 49 is mounted for longitudinal movement in a slide bushing 50 secured over an opening 51 in the frame wall 11, and its right hand end as viewed in FIGS. 4, 5 and 7 is provided with a cam follower roller 52 (FIGS. 2 and 9) which rides in a cam groove 53 in a cam 54 secured to a cam shaft 55. The latter is journaled in bearings 57 (FIG. 2) supported on the rear frame members 13 and 14, and is driven at the timed rate of one revolution for each card B fed through the throat 21 by the parent card processing mechanism in which the presently illustrated and described mechanism is incorporated.

The lateral feed cam groove 53 has a radially inward, low dwell portion 53*a*, and a wide, radially outward, high dwell portion 53*b*. During the portion of each revolution of the cam shaft 55 wherein the cam follower roller 52 is in the wide, radially outward, high dwell portion 53*b* of its cam groove 53, the link 49 is thereby released to allow the spring 43 to swing the bell crank lever 20 in a clockwise direction as viewed in FIGS. 4, 5 and 7, and thus to swing the presser roller 18 upwardly into card gripping relation with the lateral feed roller 17; while during the portion of such revolution wherein the cam follower roller is in the radially inward, low dwell portion 53*a* of its cam groove, the link 49 is withdrawn toward the right as viewed in FIGS. 4, 5 and 7 to swing the presser roller 18 downwardly clear of the lateral feed roller 17.

A pair of generally similar card guide plates 58 and 59 are hingedly mounted on a pair of brackets 60 and 61, respectively, secured to the upright wall 11, and a fixed card guide member 62 (FIGS. 2 and 4) of substantially right angle shape, is secured to the wall 11 therebetween. Portions 63 and 64 of each of the hinged guide plates 58 and 59 are flat, and when these guide plates are in their downwardly swung, operative position as shown in FIG. 4, and in solid lines in FIG. 5, these flat portions are quite close to the upper surface 40 of the bed 12 so as to guide a card B, fed through the throat 21 along the bed 12 and beneath the lateral feed roller 17.

An arched portion 65 is provided in each of the guide plates 58 and 59 to extend over the lateral feed roller shaft 15 and thus permit these plates to be swung upwardly to their broken line position shown in FIG. 4. The outer end portions 67 of these guide plates are offset upwardly for engagement by latch springs 68, as shown in FIG. 5, which releasably retain the guide plates in their downwardly swung, operative positions. The guide plates 59 are notched out at 69, as best shown in FIG. 2, to clear the presser roller 33 for the longitudinal feed roller 34, and also to clear the terminal portion of a card guide finger 70 which guides the leading edge of each laterally incoming card beneath the longitudinal feed presser roller 34.

Ths guide finger 70 is mounted on the outer face of the apron 48, as shown in FIGS. 1, 2 and 8, and is bent inwardly at 71 to overlie the bed 12 in spaced relation thereto. The inner end portion 70*a* of this guide finger 70 extends beneath the guide plate 58 as best shown in FIGS. 2 and 8 and is curved upwardly to deflect the laterally incoming therebetween.

Also, in order to insure that a laterally incoming card will not hang up on the side of the longitudinal feed roller 34, a very light leaf spring 72 (FIGS. 3, 5 and 7) is mounted in a recess 73 provided therefor in the bed 12 just inwardly of the longitudinal feed roller 34, and cams the leading edge of each laterally incoming card up over the longitudinal feed roller.

The longitudinal positioning and guide member 27 is of a length to extend throughout a major portion of the length of each card B by which it is engaged, as best shown in FIGS. 1 and 2. This positioning and guide member 27 is of light, strong, rigid material such as, for example, sheet steel, and is channel-shaped. It is mounted with the web portion of its channel perpendicular to the top surface 40 of the bed 12, and the flanges thereof extending laterally outwardly as best shown in FIGS. 4, 5 and 7. This channel member 27 is secured medially of its length, by rivets 74, to the transverse top portion of an inverted, U-shaped, leaf spring 75. The latter is of light weight, spring steel sheet, and its lower ends are secured to a bracket 77, which in turn is secured to the under side of the apron 48 by the screws 47, one of which also secures the eye plate 45 for the spring 43 to the apron.

The channel member 27 is wholly supported by the U-spring 75 at a height to extend above the bed 12 sufficiently to be engaged by successive cards B as they are fed laterally to their position of FIG. 5, and normally biases the channel member 27 lightly inwardly against the outer edge of the bed 12. Outward movement of the channel member 27 away from the bed is limited by a pair of Z-shaped brackets 78 and 79 (FIGS. 1, 2, 5 and 7) which are secured to the outer face of the apron 48, one near each end of the channel member 27.

The anchoring tongue 29, which may be of spring steel, is fixedly secured to the under side of the upper flange of the channel member 27, and extends outwardly therefrom. The tongue anchoring clamp 30 comprises a bracket 81 FIGS. 1, 2, 4, 5 and 7) of rigid sheet metal, said bracket having a base portion 82 (FIGS. 1 and 2) which is secured by screws 83 (FIG. 1) to the outer face of the apron 48. A bracket body portion 84, integral with the base portion 82, is bent outwardly at right angles thereto. An outwardly extending anvil arm 85 is formed integrally with the upper end of the bracket body portion 84, and a laterally bent, integral, anvil tab 87 is provided on the under side of the anvil arm 85 in a position to normally just clear the anchoring tongue 29 on the channel member 27.

An outwardly extending spring support arm 88 is also formed integrally on the lower end of the bracket body portion 84, and a stiff coil spring 89 is connected in tension between a tab 90 formed integrally on the outer end of this spring support arm 88 and the lower end of a clamping lever 91. The latter is pivotally mounted on a stud 92 secured to the upper portion of the bracket body portion 84, and a bearing boss 93 is secured, as by silver soldering, to the side of the clamping lever 91 away from the bracket 77 to provide extended bearing surface on the stud 92.

A projection 94, having a transversely bent clamping tab 95 thereon, extends outwardly from an upper portion of the clamping lever 91 in a position to be swung upwardly by the tension of the spring 89 to clamp the anchoring tongue 29 to the anvil tab 87. For releasing the anchoring tongue 29 during the portion of each cycle of operation when a card B is being moved laterally from its position shown in FIG. 4 to that shown in FIG. 5, a cam actuated link 97 extends from the lower end of the lever 91 through a slide bushing 98 fixedly mounted over an opening 99 in the frame wall 11, to a cam 100 mounted on the cam shaft 55.

The cam 100, except for the length and relative position of its outward and inward dwell portions, is similar to the cam 54 described previously herein, and controls the longitudinal movement of the link 97 to swing the clamping lever 91 between its spring biased, tongue gripping condition shown in FIG. 7, to its tongue releasing position shown in FIGS. 4 and 5. Relative positions of the high and low dwell portions of all three of the cams employed are shown graphically in FIG. 6, and will be referred to later herein.

The longitudinal card feel roller 34 is mounted on a shaft 101 (FIG. 2) which is journaled in suitable bearings 102 and 103 secured to the under side of the bed 12. This feed roller 34 rides in the opening 35 in the bed 12 with its periphery projecting just above the bed. A drive pulley 104 is mounted on the shaft 101 and is driven by a belt 105 from a suitable power source, such as an electric motor (not shown), at a speed sufficient to move each card lengthwise from its position of FIGS. 1 and 2 to a position longitudinally clear of the lateral feed roller 17 before the next succeeding card is moved into gripped engagement with said lateral feed roller by its associated presser roller 18.

The presser roller 33 (FIGS. 1, 2 and 8) for the longitudinal feed roller 34 is journaled on the inner end of the laterally inwardly extending arm 107 of a bell crank lever 108, which in turn is pivotally mounted on a bracket 109. This bracket 109 comprises a base plate portion 110, which is secured to the forward face of the apron 48 by screws 111, and an outwardly extending body portion 112. The base plate portion 110 is omitted from FIGS. 5 and 6 in order to reveal parts of the mechanism beyond it which it otherwise would conceal. A pivot stud 113 extends laterally from the upper end of the bracket body portion 112, and the bell crank lever 108 is pivotally mounted on this stud. A boss 114 is secured, as by silver soldering, to the side of the bell crank lever 108 away from the bracket 109 to provide extended bearing surface on this stud.

A spring-supporting arm 115, integral with the bracket body portion 112, extends outwardly from the lower end of said body portion, and a stiff coil spring 117 is connected in tension between a tab 118 on the outer end of this arm and the lower end of the downwardly extending arm of the bell crank lever 108. A cam controlled link 119 for actuating the bell crank lever 108 extends from the lower end of the downwardly extending arm 120 of the bell crank lever 108, through a slide bushing 121 (FIG. 2) fixedly mounted over an opening 122 in the frame wall 11, to a cam 123 on the cam shaft 55. A cam follower roller 124 on the link 119 rides in a cam groove 125 in the cam 123 similarly to those on the links 49 and 97 and the cams 54 and 100 described previously herein.

The inwardly extending arm 107 of the bell crank lever 108 upon which the presser roller 33 is mounted is bent at 127 (FIG. 2) through an angle of 45°, and also at 128 through another angle of 45°. A pivot stud 129 is fixedly secured to the inner end portion 130 of this bell crank lever arm 107, and the longitudinal feed presser roller 33 is journaled for free rotation on this stud directly above, and axially parallel to, the longitudinal feed roller 34.

The operation of a complete cycle of the illustrated form of the invention is as follows: With the lateral feed roller shaft 15 and the longitudinal feed roller shaft 101 driven to rotate at required speeds to feed the cards laterally and longitudinally thereof as required during the portions of each cycle assigned to these respective movements, and the cam shaft 55 rotating synchronously with the feeding of successive cards B through the throat 21, the lowermost card B in the stack 24 thereof is fed through the throat 21 in a customary manner by the card feeding mechanism (not shown) of the parent machine, and is guided along the top surface 40 of the bed by the guide plates 58 and 59 and the central angle plate 62.

FIG. 6 is an unrolled operating diagram of one rotative cycle of the three cams 54, 100 and 123 on their common cam shaft 55, beginning with the introduction of a new card into the throat 21. The upper horizontal portions of each of the cam graphs 54', 100' and 123' represent the high dwell portion of the cycle of each cam, wherein the follower roller therein is released for actuation by its respective spring 43, 89 and 117, as the case may be; while the lower horizontal portions of these graphs represent the portion of each cam cycle wherein the links are withdrawn inwardly against the tension of their respective springs.

Continuing now with the description of the operative cycle of the mechanism A; approximately as the leading edge 25 of the laterally incoming card B reaches the lateral feed roller 17, the cam 54 (FIGS. 2 and 9) releases the link 49 for movement toward the left as shown in FIGS. 4, 5 and 7. The coil spring 43 is thereby free to swing the bell crank lever 20 in a clockwise direction, as viewed in FIGS. 4, 5 and 7, biasing the presser roller 18 upwardly into card gripping relation with the constantly rotating lateral feed roller 17. The latter continues to feed the card B laterally, forcing its leading edge 25 into abutting engagement with the channel-shaped positioning and guide member 27, and forcing the latter outwardly, against the bias of its supporting U-shaped spring 75, until arrested by the Z-shaped brackets 78 and 79 as shown in FIG. 5.

During this outward movement of the channel member 27 by the card B the legs of the U-shaped spring 75 are flexed outwardly as shown in FIG. 5 in the general manner of parallel links, thereby retaining the channel member 27 against lateral tilting movement and preventing the card B engaging it from camming upwardly over this channel member, as it might do if it were not for this parallel-link-type action of the U-spring.

During this lateral card feeding stage of each cycle, the tongue clamp actuating link 97 is held inwardly by its cam 100 against the tension of the coil spring 89, thereby holding the clamping tab 95 on the lever 91 away from the tongue anchoring anvil tab 87 as shown in FIGS. 4 and 5, and permitting the anchoring tongue 29 to move freely therebetween. As the card reaches its point of maximum lateral advance shown in FIG. 5, the link 49 for the lateral feed presser roller 18 is drawn by its cam 54 inwardly, or toward the right, to the position thereof shown in FIG. 7, thereby swinging the lateral presser roller 18 downwardly away from the lateral feed roller 17 to free the card B therefrom.

Upon its release from the lateral feed roller 17 the U-spring 75 urges the channel member 27, and the card B which is in engagement therewith, back toward the right sufficiently to bring the right hand edge 28 of the card into abutting, aligned engagement with the fixed aligning bar 22 beneath the throat 21. Also, since the channel member 27 is supported medially of its length by the U-spring 75, the channel member is also moved by this same action into aligned engagement with the outer edge 25 of the card.

At this point in the cycle the tongue anchoring cam 100 releases its link 97 for movement outwardly or toward the left as shown in FIGS. 4, 5 and 7 under the tension of the coil spring 89, which thereupon swings the tongue clamping lever 91 in a clockwise direction as viewed in FIGS. 4, 5 and 7 to force the clamping tab 95 thereon against the tongue 29, thereby clamping the latter firmly to the anvil tab 87. With the tongue 29 thus firmly clamped to anchor the channel member 27, and thus held against swinging displacement on its U-spring 75, the longitudinal feed roller link 119 is released by its cam 123 for outward movement toward the right as viewed in FIG. 8, thereby allowing the coil spring 117 to swing the longitudinal presser roller bell crank lever 108 in a counter-clockwise direction, to swing the presser roller 33 downwardly from its solid to its broken line position of FIG. 7, thereby forcing the card B into driven relation with the longitudinal feed roller 34. The latter drives the card B lengthwise thereof toward the right from its position of FIGS. 1 and 2, and thence down the chute 23 to such further processing as may be provided for by the parent machine.

It will be noted in FIGS. 2, 5 and 7 that when the longitudinal feed roller 34 is in driving engagement with a card B that said roller is not on the longitudinal center line of such card. It would, therefore, tend to swing the card out of its longitudinal aligned position of FIGS. 1, 2, 5 and 7. However, during such longitudinal movement of the card, the anchor tongue 29 remains firmly gripped by the clamping means 30 so that the channel member 27 is thereby fixedly held against swinging displacement, and thus, in conjunction with the fixed aligning bar 22, retains the card B against such displacement. The tongue 29 is released just after the longitudinal presser roller, and prior to the time in each cycle when the next, successive incoming card engages the channel member 27.

Some variation in the cams from that shown in FIG. 6 is permissible, but preferably each new incoming card B is fed into the throat 21 ahead of the point in each cycle wherein the previous card has been moved endwise substantially clear of the positioning and guide member 27, and must of course arrive at the lateral feed roller 17 after the preceding card has been moved endwise clear of it.

The invention provides a simple and effective positioning and guide mechanism for a card during a 90° change in its direction of travel, and insures that the card will be gently positioned in desired aligned position, and will thereafter be guided against lateral swinging displacement between two members which are fully aligned with both edges of the card, even though the card is subjected to a substantial swinging moment, and even though there may be slight differences in width between successive cards. The invention may be easily incorporated with many types of card processing machines and is easily placed in synchronous relation with the card feeding cycles of a parent machine.

While the invention has been particularly shown and described with reference to a preferred embodiment thereof, it will be understood by those skilled in the art that various changes in form and details may be made therein without departing from the spirit and scope of the invention.

What is claimed is:

1. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; a straight, elongated positioning and guide member movably mounted in the path of the leading edge of each incoming card for movement laterally thereof by each such card, means resiliently biasing the positioning and guide member toward each incoming card and into full contacting engagement with the leading edge of each such card, and means for thereafter anchoring the positioning and guide member in such position to resist angular displacement of the positioning and guide member and such card during the subsequent feeding of such card lengthwise thereof along said positioning and guide member.

2. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; a straight, elongated positioning and guide member facing each incoming card and displaceable outwardly thereby, a straight, elongated aligning member fixedly secured generally parallel to the positioning and guide member and spaced therefrom so as to be entirely passed by each incoming card when the latter displaces the positioning and guide member outwardly, means gently urging the positioning and guide member toward the aligning member, thereby to position each card between said members and with its side edges in full, contacting engagement with both of said members, and means for anchoring the positioning and guide member against displacement in such position during the subsequent feeding of such card lengthwise thereof between said members.

3. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; a straight, elongated positioning and guide member facing each incoming card in position to be displaced outwardly by each incoming card, a straight, elongated aligning member fixedly secured substantially parallel to the positioning and guide member and spaced therefrom so as to be entirely passed by each incoming card when the latter displaces the positioning and guide member, means gently urging the positioning and guide member toward the aligning member to position each card between said members and with its side edges in full, contacting engagement with the positioning and guide member and with the aligning members, and means anchoring the positioning and guide member against displacement in such position during the subsequent feeding of such card lengthwise thereof between said members.

4. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; a straight, elongated positioning and guide member movably mounted in the path of the leading edge of each incoming card for movement laterally thereof by such card, means lightly biasing the positioning and guide member toward each incoming card, a tongue fixedly secured to said positioning and guide member to extend therefrom away from the direction from which the cards are received, and stationary anchoring means for gripping said tongue to thereby anchor the positioning and guide member to resist angular displacement thereof during the subsequent feeding of such card lengthwise thereof along said positioning and guide member.

5. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; a straight, elongated positioning and guide member, a pair of light, parallel, leaf spring elements secured at one end thereof to the table and at the other end thereof to the positioning and guide member, thereby resiliently positioning said member in the path of the leading edge of each incoming card for movement laterally thereof by such card, and into full contacting engagement with such leading edge of the card, the leaf springs flexing in unison during such movement to prevent lateral tilting of the positioning and guide member, and means for thereafter anchoring the positioning and guide member in such position to resist angular displacement thereof during the subsequent feeding of such card lengthwise thereof along said positioning and guide member.

6. An arrangement according to claim 5 wherein the leaf spring elements comprise the legs of a U-shaped leaf spring.

7. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; an elongated aligning member secured to the table adjacent the path along which the cards are fed onto the table, a positioning and guide member normally spaced from the aligning member by a distance less than the width of such cards, means for feeding each card fed onto the table to a position between the positioning and guide member and the aligning member and spaced from one thereof, means lightly urging the positioning and guide member and the aligning member toward each other into full contacting alignment with opposite side edges of such card, and anchoring the aligning member and means for anchoring the positioning and guide member against displacement from such full, contacting position during the subsequent feeding movement of such card lengthwise thereof from the table.

8. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; an elongated aligning member secured to the table below the path along which the cards are fed onto the table, a laterally movable positioning and guide member generally parallel to the aligning member and normally spaced therefrom by a distance less than the width of such cards, each card being fed onto the table to a position beyond the aligning member and into laterally displacing engagement with the positioning and guide member, timed means for releasing each such card from the lateral feed means, means lightly urging the positioning and guide member and the released card toward the aligning member to a position wherein both of said members are in full, contacting alignment with their respective edges of such card, and timed anchoring means for anchoring the positioning and guide member against displacement from such aligned position during the subsequent feeding of such card, lengthwise thereof, from the table.

9. Card aligning and guide mechanism for combination with a card processing mechanism wherein a plurality of elongated, substantially identical, generally rectangular cards are fed, one at a time, in timed sequence, and transversely of their length, onto a table, and wherein each such card is then fed lengthwise thereof from the table prior to the completion of the transverse feeding of a next succeeding card; an elongated aligning member secured to the table adjacent the path along which the cards are fed onto the table, a spring mounted positioning and guide member generally parallel to the aligning member and normally spaced therefrom by a distance less than the width of such cards, lateral feed means for gripping each card fed onto the table and continuing the feeding of such card transversely of its length to a position beyond the aligning member and into laterally displacing relation with the positioning and guide member, timed means for releasing such card from the lateral feed means for return by the positioning and guide member into lightly spring pressed relation between the positioning and guide member and the aligning member with both of the latter members in contacting alignment with their respective edges of such card, and timed anchoring means for anchoring the positioning and guide member against displacement from such aligned position for guiding such card during the subsequent feeding of such card, lengthwise thereof, from the table.

References Cited in the file of this patent

UNITED STATES PATENTS

| | | |
|---|---|---|
| 1,448,301 | Hotchkiss | Mar. 13, 1923 |
| 2,334,645 | Plumb | Nov. 16, 1943 |
| 2,647,581 | Gardinor et al. | Aug. 4, 1953 |
| 2,655,876 | Stickelber | Oct. 20, 1953 |
| 2,938,724 | Buccicone | May 31, 1960 |
| 3,032,340 | Lawrence | May 1, 1962 |